United States Patent
Leppinen et al.

(10) Patent No.: US 12,036,478 B2
(45) Date of Patent: *Jul. 16, 2024

(54) METHOD AND SYSTEM FOR MANAGING MULTIPLAYER GAME SESSIONS

(71) Applicant: Supercell Oy, Helsinki (FI)

(72) Inventors: Lassi Leppinen, Espoo (FI); Tommi Hakala, Sipoo (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,875

(22) Filed: Feb. 7, 2022

(65) Prior Publication Data

US 2022/0249959 A1  Aug. 11, 2022

Related U.S. Application Data

(63) Continuation of application No. 16/504,759, filed on Jul. 8, 2019, now Pat. No. 11,241,627, which is a
(Continued)

(51) Int. Cl.
*A63F 13/795* (2014.01)
*A63F 13/35* (2014.01)
(Continued)

(52) U.S. Cl.
CPC ............ *A63F 13/795* (2014.09); *A63F 13/35* (2014.09); *A63F 13/352* (2014.09); *A63F 13/79* (2014.09); *A63F 2300/5566* (2013.01)

(58) Field of Classification Search
CPC .......... A63F 13/12; A63F 13/31; A63F 13/35; A63F 13/352; A63F 13/795; A63F 2300/5566
See application file for complete search history.

(56) References Cited

U.S. PATENT DOCUMENTS

| | | | |
|---|---|---|---|
| 9,071,603 B1 * | 6/2015 | Frederick | H04L 67/1091 |
| 2002/0034980 A1 * | 3/2002 | Lemmons | A63F 3/081 |
| | | | 463/40 |

(Continued)

FOREIGN PATENT DOCUMENTS

| | | |
|---|---|---|
| JP | 2005270649 A | 10/2005 |
| JP | 2009213737 A | 9/2009 |
| KR | 1020100075507 A | 7/2010 |

OTHER PUBLICATIONS

Korean Intellectual Property Office, Notice of Non-Final Rejection, Application No. 10-2018-7020805, mailed Mar. 7, 2022, 9 pages. English Translation Attached, 8 pages.

(Continued)

*Primary Examiner* — Malina D. Blaise
(74) *Attorney, Agent, or Firm* — Ziegler IP Law Group LLC.

(57) ABSTRACT

A method for managing a game session of a multiplayer game is provided. A request to start a game session of the multiplayer game is received from a first party. The first party is associated with a first category of players of the multiplayer game, and the number of players within the first category is determined. If the number of players within the first category is below a threshold number, an invite is sent to at least a second party associated with the first category. Upon receiving a request to join a game session of the multiplayer game from the at least a second party, a game session of the multiplayer game is started by accepting the request from the first party, and the at least a second party is added to the game session of the multiplayer game.

12 Claims, 7 Drawing Sheets

Related U.S. Application Data continuation of application No. 15/016,570, filed on Feb. 5, 2016, now Pat. No. 10,350,500, which is a continuation-in-part of application No. PCT/FI2015/050946, filed on Dec. 28, 2015.

(51) Int. Cl.
*A63F 13/352* (2014.01)
*A63F 13/79* (2014.01)

(56) References Cited

U.S. PATENT DOCUMENTS

| | | | |
|---|---|---|---|
| 2006/0287096 A1* | 12/2006 | O'Kelley | A63F 13/30 |
| | | | 463/42 |
| 2007/0117617 A1* | 5/2007 | Spanton | A63F 13/12 |
| | | | 463/40 |
| 2012/0309539 A1* | 12/2012 | Smith | A63F 13/795 |
| | | | 463/42 |
| 2012/0310956 A1* | 12/2012 | Huhn | A63F 13/795 |
| | | | 707/769 |
| 2012/0310959 A1* | 12/2012 | Huhn | G06F 16/2282 |
| | | | 707/E17.014 |
| 2012/0311036 A1* | 12/2012 | Huhn | H04L 51/48 |
| | | | 709/204 |
| 2013/0102392 A1* | 4/2013 | Nakata | A63F 13/35 |
| | | | 709/204 |
| 2013/0254278 A1* | 9/2013 | Buhr | G06Q 50/01 |
| | | | 709/204 |
| 2014/0018152 A1* | 1/2014 | Kislyi | A63F 13/12 |
| | | | 463/23 |
| 2014/0177813 A1* | 6/2014 | Leeds | H04M 3/42348 |
| | | | 379/67.1 |
| 2014/0274402 A1* | 9/2014 | Michel | A63F 13/12 |
| | | | 463/42 |
| 2015/0038233 A1* | 2/2015 | Rom | A63F 13/42 |
| | | | 463/42 |
| 2015/0088624 A1* | 3/2015 | Frederick | G06Q 30/0209 |
| | | | 705/14.12 |
| 2016/0001184 A1* | 1/2016 | Sepulveda | A63F 13/60 |
| | | | 463/31 |
| 2016/0001187 A1* | 1/2016 | Sepulveda | A63F 13/49 |
| | | | 463/31 |
| 2016/0086137 A1* | 3/2016 | Ackerman | G06Q 10/1095 |
| | | | 705/7.19 |
| 2016/0166935 A1* | 6/2016 | Condrey | A63F 13/48 |
| | | | 463/31 |
| 2016/0206961 A1* | 7/2016 | Taylor | A63F 13/795 |
| 2016/0332073 A1* | 11/2016 | Marr | A63F 13/44 |

OTHER PUBLICATIONS

Japan Patent Office, Decision to Grant a Patent, Application No. 2020-158326, Mailed Nov. 16, 2022, 3 pages.

\* cited by examiner

METHOD AND SYSTEM FOR MANAGING MULTIPLAYER GAME SESSIONS

TECHNICAL FIELD

The present disclosure relates generally to multiplayer games, and more specifically, to methods for managing a game session of a multiplayer game. Moreover, the present disclosure relates to systems for managing a game session of a multiplayer game. Furthermore, the present disclosure also concerns apparatus suitable for use in the aforementioned systems.

BACKGROUND

Multiplayer games are games in which two or more players play together, for example, against each other. A problem faced by the multiplayer games is to match up two or more players together in a meaning full manner. The meaning full manner refers to a situation wherein players in a game session have at least one characteristic feature that is common or close to common. Examples of such characteristic feature include skills of players, game levels, skill levels, highest scores of the players. As an example, it could be desirable to match up only those players who are within a certain game level.

At present, matching in a multiplayer game is performed by a server system, which has information about characteristics of players of the game. The players are clustered into different skill-level clusters. For a given player, the matching is performed within his/her cluster, by connecting players who are online at a given time and have indicated willingness to start playing the game.

A problem with this approach is that if the size of the cluster is too small, the given player may have to wait too long to find another player. On the other hand, if the size of the cluster is too large, the given player may be matched up with a player whose skill levels are not similar to his/her skill levels.

SUMMARY

The present disclosure seeks to provide an improved method for managing a game session of a multiplayer game. The present disclosure also seeks to provide an improved system for managing a game session of a multiplayer game. A further aim of the present disclosure is to at least partially overcome at least some of the problems of the prior art, as discussed above.

In a first aspect, embodiments of the present disclosure provide a method for managing a game session of a multiplayer game, the method comprising:
receiving a request to start a game session of the multiplayer game from a first party;
associating the first party with a first category of players of the multiplayer game;
determining a number of players within the first category;
sending an invite to at least a second party associated with the first category if the number of players within the first category is below a threshold number;
receiving a request to join a game session of the multiplayer game from the at least a second party associated with the first category;
starting a game session of the multiplayer game by accepting the request from the first party; and
adding the at least a second party to the game session of the multiplayer game.

In a second aspect, embodiments of the present disclosure provide a system for managing a game session of a multiplayer game, the system comprising a game server configured to:
receive a request to start a game session of the multiplayer game from a first party;
associate the first party with a first category of players of the multiplayer game;
determine a number of players within the first category;
send an invite to at least a second party associated with the first category if the number of players within the first category is below a threshold number;
receive a request to join a game session of the multiplayer game from the at least a second party associated with the first category;
start a game session of the multiplayer game by accepting the request from the first party; and
add the at least a second party to the game session of the multiplayer game.

In a third aspect, embodiments of the present disclosure provide an apparatus comprising:
a memory for storing instructions;
a processor coupled to the memory;
a display coupled to the processor; and
a communication interface coupled to the processor;
wherein the processor is configured to execute the instructions to:
use the communication interface to receive, via a push notification message, first data indicative of an invite to join a game session of a multiplayer game;
analyze the first data to render the invite on the display;
determine, from a user's input, whether or not the user has accepted the invite to join the game session of the multiplayer game; and
start the multiplayer game stored in the memory, if the user has accepted the invite to join the game session of the multiplayer game.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
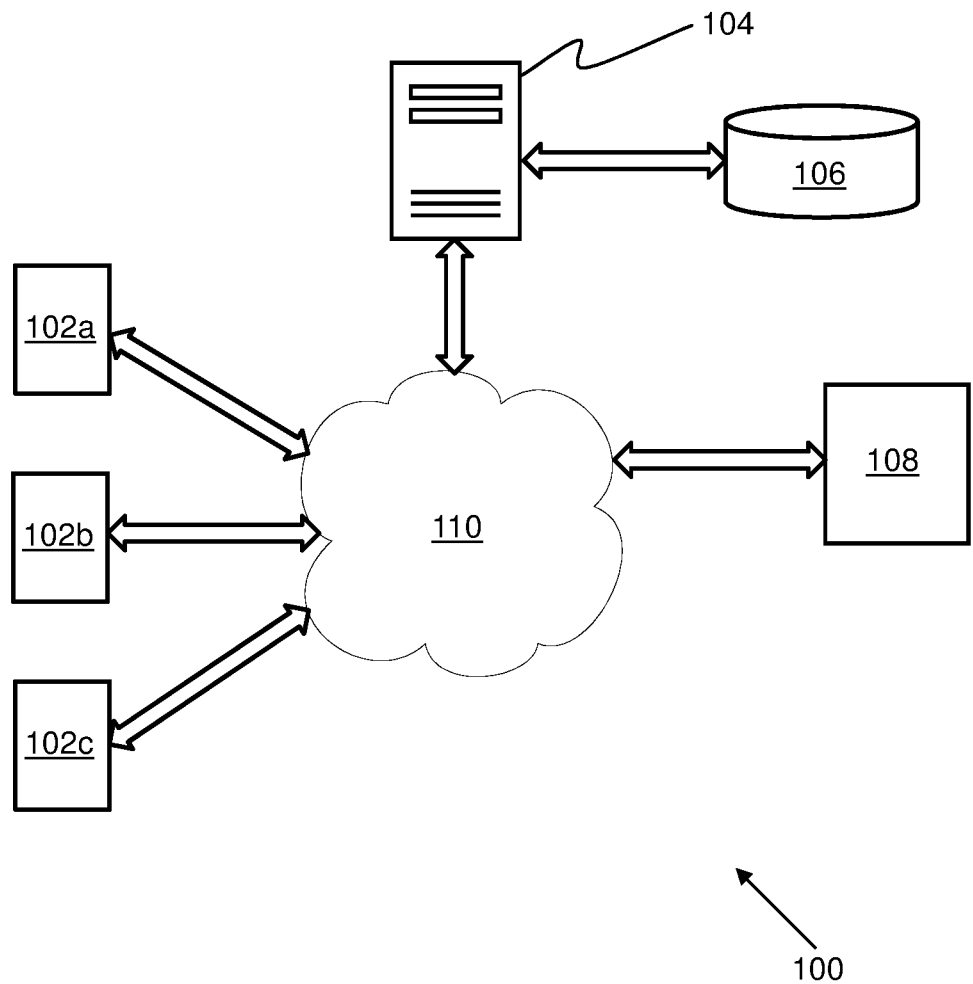
FIG. 1 is a schematic illustration of a network environment, wherein a system for managing a game session of a multiplayer game is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

The term "multiplayer game" generally refers to a game in which two or more players play together in real time or near real time. As an example, a multiplayer game can be a strategy game, wherein two or more players play against each other in real time or near real time.

The term "game session" generally refers to a given session of a multiplayer game in which a plurality of players, who have joined the given session, play the multiplayer game together in real time or near real time.

The term "leader board" generally refers to a scoreboard of a multiplayer game. According to an embodiment of the present disclosure, a leader board of a given multiplayer game includes names of players of the given multiplayer game and ranking positions of these players. Additionally, optionally, the leader board also includes individual highest scores and/or current scores of the players.

The term "game server" generally refers to a server that provides a multiplayer game service to a plurality of parties, namely clients.

The term "party" generally refers to a client associated with a player of a multiplayer game.

The term "server" generally refers to an application, program, process or device in a client/server relationship that responds to requests for information or services by another application, program, process or device (a client) on a communication network. The term "server" also encompasses software that makes the act of serving information or providing services possible.

The term "client" generally refers to an application, program, process or device in a client/server relationship that requests information or services from another application, program, process or device (a server) on a communication network. Importantly, the terms "client" and "server" are relative since an application may be a client to one application but a server to another application. The term "client" also encompasses software that makes the connection between a requesting application, program, process or device and a server possible, such as an File Transfer Protocol (FTP) client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

EMBODIMENTS OF THE PRESENT DISCLOSURE

In a first aspect, embodiments of the present disclosure provide a method for managing a game session of a multiplayer game, the method comprising:

receiving a request to start a game session of the multiplayer game from a first party;

associating the first party with a first category of players of the multiplayer game;

determining a number of players within the first category;

sending an invite to at least a second party associated with the first category if the number of players within the first category is below a threshold number;

receiving a request to join a game session of the multiplayer game from the at least a second party associated with the first category;

starting a game session of the multiplayer game by accepting the request from the first party; and adding the at least a second party to the game session of the multiplayer game.

According to an embodiment of the present disclosure, the aforementioned method is performed by a game server, wherein the game server provides a multiplayer game service to a plurality of parties, including the first party and the at least a second party.

Throughout the present disclosure, the term "first party" refers to a client associated with a player of the multiplayer game, who has made the request to start a new game session, while the term "at least a second party" refers to at least one client associated with at least one player of the multiplayer game to which the invite is sent. Hereinafter, the player who has made the request to start the game session is referred to as "initiating player", while the at least one player to whom the invite is sent is referred to as "receiving player".

The first party and the at least a second party are associated with a same category of players of the multiplayer game, namely the first category of players. According to an embodiment of the present disclosure, the first category is a category in which the first party and the at least a second party have substantially similar skill levels related to the multiplayer game. Optionally, in this regard, the skill levels are derived from a leader board of the multiplayer game. Additionally or alternatively the category can refer to a group of players in same stage or level of the multiplayer game. Additionally or alternatively the category can refer to a group of players playing belonging in a same group of players such as a team of players or players from certain location (country, area, continent) or from certain demography (male, female, age). Additionally or alternatively the category can refer to players having same or similar game devices. Additionally or alternatively the category can refer to players having same or similar resources in the game. The resources can refer to available credits in the game, available tools, weapons, assets, progress level of the game objects etc.

According to an embodiment of the present disclosure, the first category includes players whose ranking positions are within a predetermined range with respect to a ranking position of the initiating player, such that the first category includes both players with better ranking positions and players with worse ranking positions with respect to the initiating player. Optionally, in this regard, the first category includes players whose ranking positions fall within ranking positions "x+y" and "x−y" in the leader board, wherein "x" is the ranking position of the initiating player and "y" is a positive integer, for example, such as 5, 10, 15, and so forth. As an example, if the ranking position of the initiating player, x, is "30" and y is "10", then the first category includes players whose ranking positions fall within ranking positions "20" and "40", and the number of players within the first category is 20. As another example, if the ranking position of the initiating player, x, is "1" and y is "9", then the first category includes players whose ranking positions fall within ranking positions "2" and "10", and the number of players within the first category is 9.

According to another embodiment of the present disclosure, the first category includes players having a certain type of subscription to the multiplayer game. Optionally, in such a case, the number of players within the first category is the number of players in that certain type of subscription.

When the number of players within the first category is below the threshold number, it is likely that the initiating player does not find another player to play the multiplayer game within a desired waiting time. Therefore, in order to increase a likelihood of the initiating player finding at least one player to play the multiplayer game, the invite is sent to at least one player within the first category.

According to an embodiment of the present disclosure, the method further includes sending the invite to more players within the first category, if the request to join from the at least a second party is not received within a second predetermined period of time.

Optionally, in this regard, the invite is sent to a plurality of parties associated with the first category. More optionally, the invite is sent to all parties associated with the first category.

Moreover, according to an embodiment of the present disclosure, the invite is sent using push notification technology. Optionally, in this regard, the invite is sent as a push notification message, which includes information that enables a game device of the receiving player to start an application of the multiplayer game (hereinafter referred to as "game application"), if the receiving player chooses to start the game application, for example, by clicking on the push notification message. As an example, the invite can be sent using the Apple Push Notification service (APNs) by Apple Inc. ("Apple" is a registered trademark).

It is to be noted here that the game application is not required to be already running on the game device of the receiving player at the time when the push notification message is received, as the game application can be launched from the push notification message itself. In other words, there is no requirement for the game application to be active at the time of receipt of the push notification message.

Furthermore, according to an embodiment of the present disclosure, the method further comprises determining the threshold number based upon a probability of at least one party to join in the multiplayer game within a first predetermined period of time. As an example, the first predefined period of time can be a waiting time of 15 seconds, 10 seconds, 5 seconds or shorter, 30 seconds, 60 seconds or longer. Optionally, the probability of at least one party to join is a function of the number of players in the first category, an average time in which players start a new game session, and a desired waiting time for at least one other party to join.

In other words, if the probability of at least one party to join is greater than a predetermined threshold value, no invite is required to be sent. As an example, the predetermined threshold value can be 0.95.

For illustration purposes only, there will now be considered an example of how the threshold number is determined. It will be appreciated that a new game session of a multiplayer game can be started only when there are at least two players who have indicated willingness to play the multiplayer game. In the illustrated example, there will now be considered the following:

(i) a player "$G_0$" has indicated willingness to play the multiplayer game, namely by making a request to start a new game session of the multiplayer game;

(ii) "n" is the number of other players "$G_1$", "$G_2$", . . . "$G_n$" within a category associated with the player "$G_0$";

(iii) "t1" is a time in which at least one of the other players would also indicate willingness to play the multiplayer game with a probability "p1" of 1; in other words, the at least one of the other players will definitely join the game session within time "d";

(iv) "p2" is a probability that the player "$G_0$" would wait for at least one of the other players to join the game session till time "t2"; and (v) "p3" is a probability that a given player would join the game session by time "t2"; p3=t2/t1.

For "n" number of the other players, a probability that at least one of the other players would join the game session by time "t2" can be calculated as:

$$p3 \times n$$

The probability that at least one of the other players would join the game session by time "t2" should be greater than or equal to the probability that the player "$G_0$" would wait for at least one of the other players to join the game session till time "t2". Thus, the number of the other players within the category can be calculated as follows:

$$p3 \times n \geq p2$$

$$n \geq p2/p3 = p2/(t2/t1) = p2 \times t1/t2$$

As an example, if the time "0" is 100 seconds, the time "t2" is 15 seconds and the probability "p2" is 0.9, then the threshold number is six (=0.9×100/15=6). In other words, there should be at least six other players to achieve an expected waiting time of 15 seconds. In such a case, an invite would be sent if the number of players within the category is less than six.

As another example, if the time "0" is 100 seconds, the time "t2" is 5 seconds and the probability "p2" is 0.9, then the threshold number is 18 (=0.9×100/5). In other words, there should be at least 18 other players to achieve an expected waiting time of 5 seconds. In such a case, an invite would be sent if the number of players within the category is less than 18.

Optionally, the time "t1" and the probability "p2" are determined based upon statistical data of the multiplayer game. Such statistical data is optionally collected by the game server. As an example, the statistical data can be collected for a predetermined number of most recent game sessions of the multiplayer game. As another example, the statistical data can be collected for game sessions started and/or ended within a predetermined time period.

It is to be noted here that the above calculations have been performed for a two-player game. For a three-player game, a new game session can be started only when there are at least three players who have indicated willingness to play. In general for N player game a new game session can be started only when there are at least N players who have indicated willingness to play.

Moreover, according to an embodiment of the present disclosure, the method further comprises sending an invite to at least a third party associated with a second category, if the request to join from the at least a second party is not received within a second predetermined period of time.

The second category is different from the first category. Optionally, the number of players within the second category is larger than the number of players within the first category. This increases a likelihood of the initiating player finding at least one player to play the multiplayer game.

As an example, the second category could include players whose ranking positions fall within ranking positions "x+z" and "x-z" in the leader board, wherein "z" is a positive integer greater than "y". In such a case, the second category is a superset of the first category.

For illustration purposes only, there will now be considered an example implementation of the aforementioned method pursuant to embodiments of the present disclosure. Game devices of players A and B have a game application of a same multiplayer game installed therein. For the players A and B to be able to play the multiplayer game together in real time or near real time, it is required that both the players A and B start the game application on their respective game devices and the game devices are connected in a same game session.

An example operation loop includes the following steps:

Step 1: A first player starts the game application on his/her game device and indicates willingness to play the multiplayer game. Correspondingly, a request to start a new game session of the multiplayer game is sent to a game server.

Step 2: The game server associates the first player with a first category of players, and searches for other online players within the first category, namely other players within the first category who have also indicated willingness to play the multiplayer game. If no online player is found in the search, a step 3 is performed. Otherwise, if at least one online player is found in the search, the game server starts a new game session of the multiplayer game and adds the first player and the at least one online player to the new game session.

Step 3: The game server determines whether or not the number of players within the first category is less than a threshold number. If it is determined that the number of players within the first category is more than or equal to the threshold number, a step 4 is performed. Otherwise, if it is determined that the number of players within the first category is less than the threshold number, a step 5 is performed.

Step 4: The game server waits for a first predetermined period of time. If none of the players within the first category indicates willingness to play the multiplayer game within the first predetermined period of time, the game server associates the first player with a second category of players, and repeats the step 2 for the second category of players.

Step 5: The game server sends, to a push notification server, a request to send an invite to at least a second player within the first category.

Step 6: The push notification server then sends the invite to the at least a second player within the first category.

Step 7: If the at least a second player indicates willingness to play the multiplayer game against the first player, a request to join a game session of the multiplayer game is sent to the game server and a step 8 is performed. If the request to join from the at least a second player is not received within a second predetermined period of time, the game server associates the first player with a second category of players, and repeats the step 2 for the second category of players.

Step 8: The game devices of the first player and the at least a second player are connected in a same game session, thereby enabling the first player and the at least a second player to play the multiplayer game against each other. The game session is synchronized via the game server.

Step 9: After the game session of the multiplayer game is ended, a leader board of the multiplayer game is updated. Optionally, in this step, relative ranking positions of the first player and the at least a second player are updated.

In a second aspect, embodiments of the present disclosure provide a system for managing a game session of a multiplayer game, the system comprising a game server configured to:

receive a request to start a game session of the multiplayer game from a first party;

associate the first party with a first category of players of the multiplayer game;

determine a number of players within the first category;

send an invite to at least a second party associated with the first category if the number of players within the first category is below a threshold number;

receive a request to join a game session of the multiplayer game from the at least a second party associated with the first category;

start a game session of the multiplayer game by accepting the request from the first party; and add the at least a second party to the game session of the multiplayer game.

The game server provides a multiplayer game service to a plurality of parties, including the first party and the at least a second party.

The first party and the at least a second party are associated with a same category of players of the multiplayer game, namely the first category of players. According to an embodiment of the present disclosure, the first category is a category in which the first party and the at least a second party have substantially similar skill levels related to the multiplayer game. Optionally, in this regard, the skill levels are derived from a leader board of the multiplayer game, wherein the leader board is stored in a game server database associated with the game server.

Optionally, the game server is further configured to send the invite to a plurality of parties associated with the first category. More optionally, the game server is further configured to send the invite to all parties associated with the first category.

Moreover, according to an embodiment of the present disclosure, the game server is further configured to send the invite via a push notification server. Optionally, in this regard, the invite is sent as a push notification message, which includes information that enables a game device associated with the at least a second party to start an application of the multiplayer game, if the at least a second party chooses to start the game application, for example, by clicking on the push notification message.

Furthermore, according to an embodiment of the present disclosure, the game server is further configured to determine the threshold number based upon a probability of at least one party to join in the multiplayer game within a first predetermined period of time, wherein the time is counted at the game server. Alternatively the threshold number can be a pre determined number. The predetermined number can be stored in a game server. Optionally the threshold number can be adjusted from time to time.

According to an embodiment of the present disclosure, the game server is further configured to send an invite to at least a third party associated with a second category if the request to join from the at least a second party is not received within a second predetermined period of time.

For illustration purposes only, there will now be considered an example environment, wherein a system for managing a game session of a multiplayer game is implemented pursuant to embodiments of the present disclosure. One such example environment has been illustrated in conjunction with FIG. 1 as explained in more detail below.

The example environment includes a plurality of game devices associated with a plurality of players, a game server, a game server database associated with the game server, a push notification server, and a communication network.

The game server is coupled in communication with the game devices and the push notification server via the communication network. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, Worldwide Interoperability for Microwave Access (WiMAX) networks, and short-range wireless communication networks, such as a "Bluetooth" network ("Bluetooth" is a registered trademark).

Examples of the game devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs). Some specific examples of the game devices include, but are not limited to, iPhone, iPad, Android phone, Android web pad, Windows phone, and Windows web pad (these names include registered trademarks).

The game server provides a multiplayer game service to clients associated with the game devices. The game devices have a game application (namely, client) of the multiplayer game installed therein, wherein the game application is configured to communicate with the game server. The game server coordinates and synchronizes the game application running on game devices of players who are playing together, for example, against each other.

Moreover, the game server stores, at the game server database, information pertaining to rules of the multiplayer game and other game-related information. Optionally, the game-related information includes a leader board of the multiplayer game. Additionally, optionally, the game-related information includes at least one of: credits of the players, scores of the players, status of games being played by the players, progress of the games being played by the players, game levels at which the players are playing, skills of the players, and/or associated time-stamps.

Furthermore, the game server uses a push notification service provided by the push notification server, when invites are required to be sent. Optionally, in this regard, the game server defines communication content of the invites.

In a third aspect, embodiments of the present disclosure provide an apparatus comprising:
a memory for storing instructions;
a processor coupled to the memory;
a display coupled to the processor; and
a communication interface coupled to the processor;
wherein the processor is configured to execute the instructions to:
use the communication interface to receive, via a push notification message, first data indicative of an invite to join a game session of a multiplayer game;
analyze the first data to render the invite on the display;
determine, from a user's input, whether or not the user has accepted the invite to join the game session of the multiplayer game; and
start the multiplayer game stored in the memory, if the user has accepted the invite to join the game session of the multiplayer game.

Examples of the apparatus include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs). Some specific examples of the apparatus include, but are not limited to, iPhone, iPad, Android phone, Android web pad, Windows phone, and Windows web pad (these names include registered trademarks).

Furthermore, an example of the apparatus has been illustrated in conjunction with FIG. 3 as explained in more detail below. The apparatus includes, but is not limited to, a memory, computing hardware such as a processor, a display, other Input/Output (I/O) devices, a communication interface, and a power source.

The power source supplies electrical power to various components of the apparatus. The power source may, for example, include a rechargeable battery.

The memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The memory stores a game application, while the processor is operable to execute the game application. Executing the game application on the processor results in generating and rendering a graphical user interface on the display.

The I/O devices facilitate a user input interface, which is optionally configured to detect an input corresponding to moving a pointer object, clicking or tapping the pointer object, or swiping a touch-sensitive object over the graphical user interface.

In an embodiment, the display is a touch-sensitive display screen that is operable to provide the user input interface. The touch-sensitive display screen is operable to receive tactile inputs from a user. These tactile inputs may, for example, include clicking, tapping, pointing, moving, pressing and/or swiping with a finger or a touch-sensitive object like a pen.

Additionally or alternatively, optionally, the I/O devices include a mouse, a keyboard or a joystick that is operable to receive inputs corresponding to clicking, pointing, and/or moving a pointer object on the graphical user interface.

Moreover, optionally, the I/O devices also include a speaker for providing an audio output to the user, and a microphone for receiving an audio input from the user.

Furthermore, the communication interface enables the processor to communicate with a game server, for example, via a communication network. The communication interface also enables the processor to receive a push notification message pertaining to an invite to join a game session of a multiplayer game.

DETAILED DESCRIPTION OF THE DRAWINGS

Referring now to the drawings, particularly by their reference numbers, FIG. 1 is a schematic illustration of a network environment 100, wherein a system for managing a game session of a multiplayer game is implemented pursuant to embodiments of the present disclosure.

The network environment 100 includes a plurality of game devices associated with a plurality of players, depicted as a game device 102a, a game device 102b and a game device 102c (hereinafter collectively referred to as game devices 102). The network environment 100 also includes a game server 104, a game server database 106 associated with the game server 104, a push notification server 108, and a communication network 110.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of game devices, game servers, game server databases, push notification servers and communication networks. A person skilled in the art will recognize many variations, alternatives, and modifications of embodiments of the present disclosure.

Figure 2A:
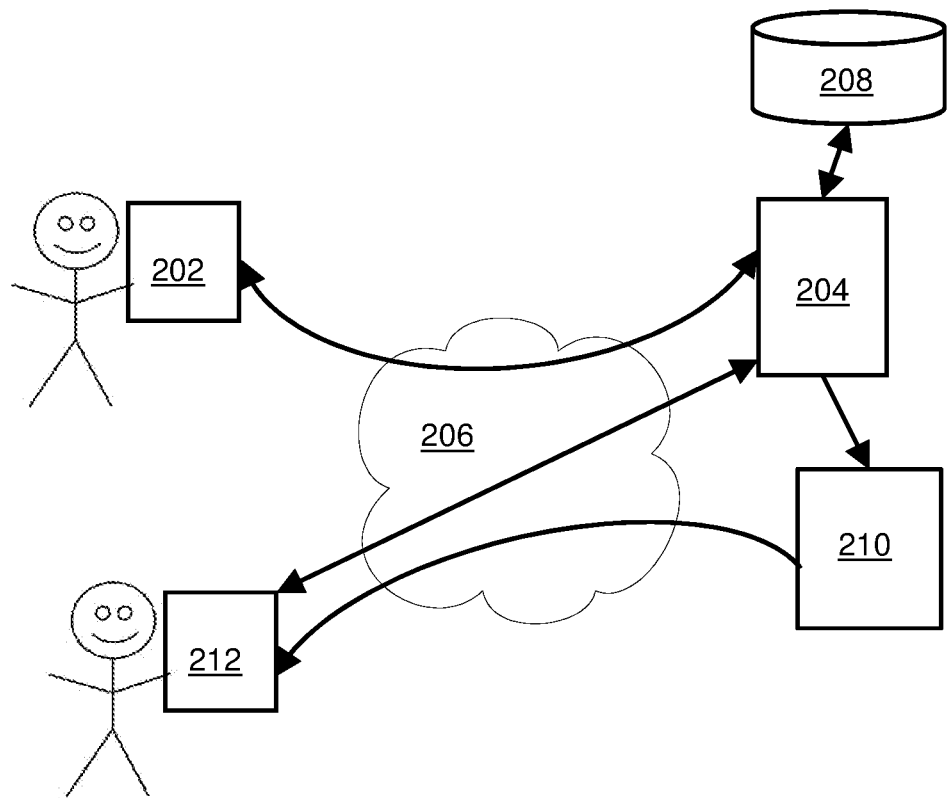
FIGS. 2A and 2B are schematic illustrations of an example data flow when a game session of a multiplayer game is managed, in accordance with an embodiment of the present disclosure.
Figure 2B:
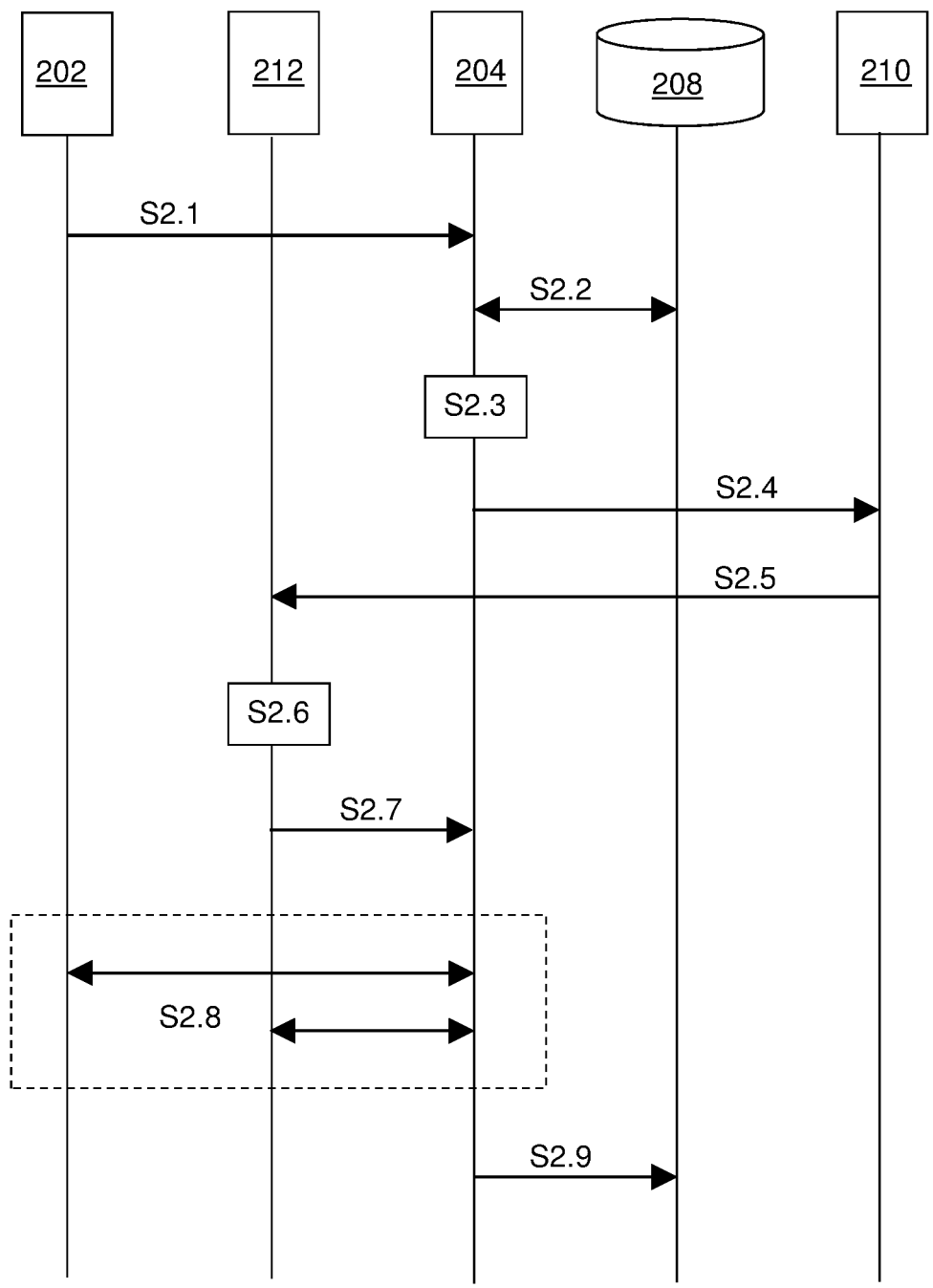

FIGS. 2A and 2B are schematic illustrations of an example data flow when a game session of a multiplayer game is managed, in accordance with an embodiment of the present disclosure.

A player associated with a game device 202 (hereinafter referred to as "initiating player") starts a game application of a multiplayer game on the game device 202, and initiates a request to start a new game session of the multiplayer game. Consequently, at a step S2.1, the game device 202 sends the request to a game server 204, via a communication network 206.

At a step S2.2, the game server 204 then associates the initiating player with a category, using information stored at a game server database 208.

At a step S2.3, the game server 204 searches for other online players (in practice other online players are those who have also initiated a request to start a new game session. I.e. matching two players who have both initiated a request to start a new game session), within the category. If no online player is found in the search, the game server 204 determines whether or not the number of players within the category is less than a threshold number. If it is determined that the number of players within the category is less than the threshold number, a step 2.4 is performed.

At the step 2.4, the game server 204 sends, to a push notification server 210, a request to send an invite to at least one other player within the category. Consequently, at a step 2.5, the push notification server 210 sends the invite to a game device 212 associated with the at least one other player (hereinafter referred to as "receiving player"), via the communication network 206.

At a step 2.6, the receiving player accepts the invite. Consequently, at a step 2.7, the game device 212 sends a request to join to the game server 204.

At a step 2.8, the game server 204 starts a new game session of the multiplayer game and adds the initiating player and the receiving player to the new game session. The game server 204 synchronizes the game session.

At a step 2.9, when the game session ends, the game server 204 updates the information stored at the game server database 208.

FIG. 2 is merely an example, which should not unduly limit the scope of the claims herein. A person skilled in the art will recognize many variations, alternatives, and modifications of embodiments of the present disclosure.

Figure 3:
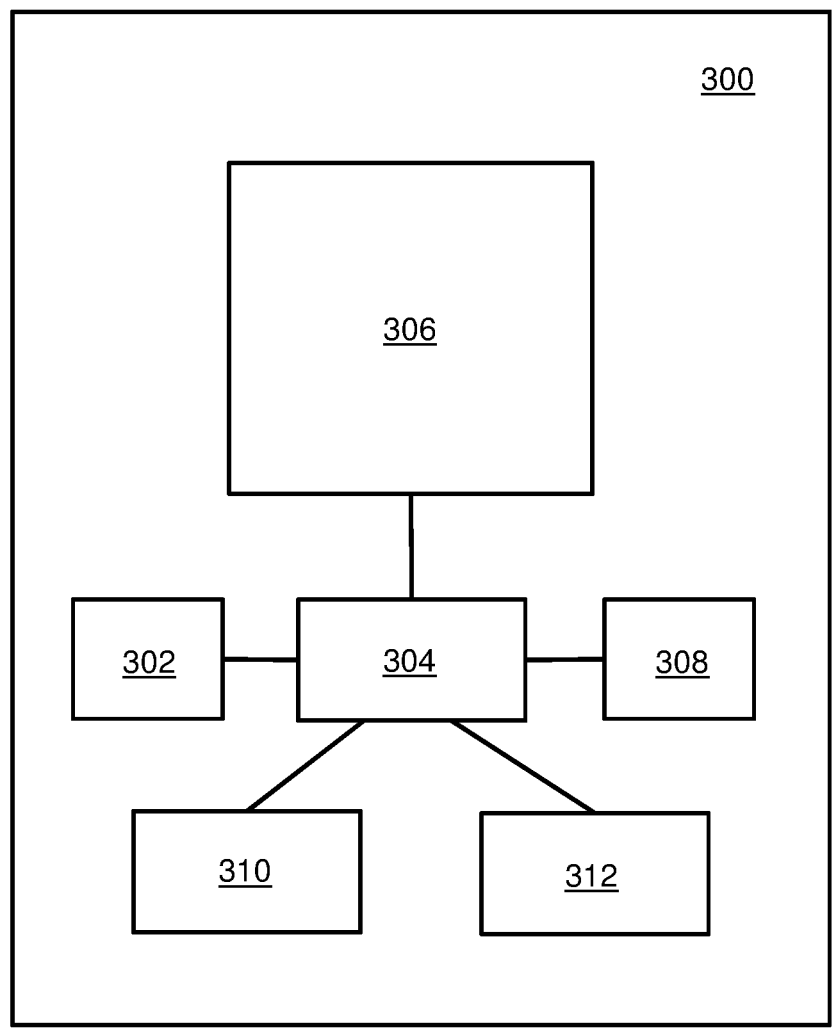
FIG. 3 is a schematic illustration of various components of an apparatus, in accordance with an embodiment of the present disclosure.

FIG. 3 is a schematic illustration of various components of an apparatus 300, in accordance with an embodiment of the present disclosure. The apparatus 300 includes, but is not limited to, a memory 302, computing hardware such as a processor 304, a display 306, other Input/Output (I/O) devices 308, a communication interface 310, and a power source 312.

FIG. 3 is merely an example, which should not unduly limit the scope of the claims herein. It is to be understood that the specific designation for the apparatus 300 is provided as an example and is not to be construed as limiting the apparatus 300 to specific numbers, types, or arrangements of modules and/or components of the apparatus 300. A person skilled in the art will recognize many variations, alternatives, and modifications of embodiments of the present disclosure. For example, the apparatus 300 could be implemented as the game devices 102, 202 and 212, and vice versa.

Figure 4A:
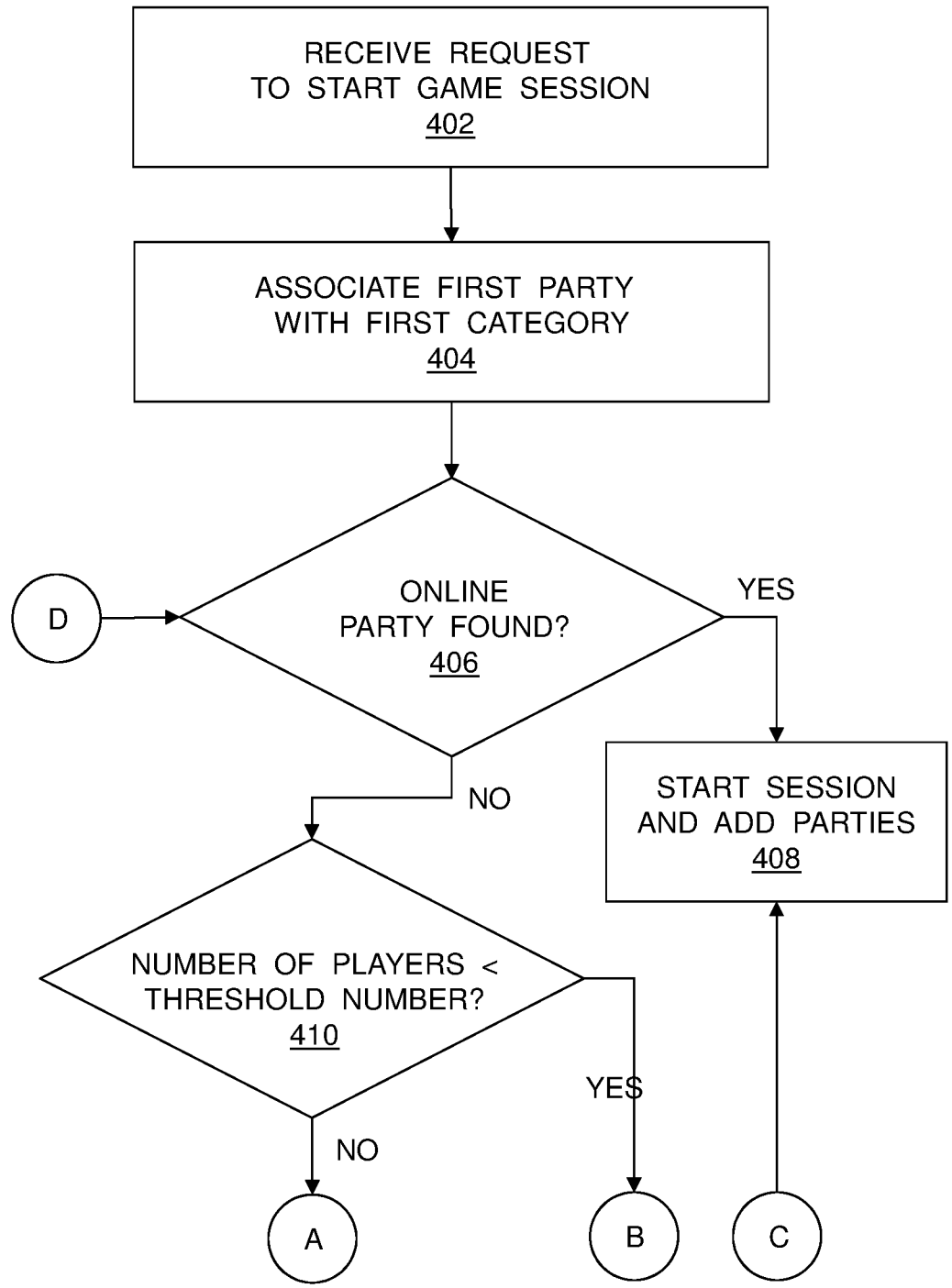
FIGS. 4A, 4B and 4C collectively are an illustration of steps of a method for managing a game session of a multiplayer game, in accordance with an embodiment of the present disclosure.
Figure 4B:
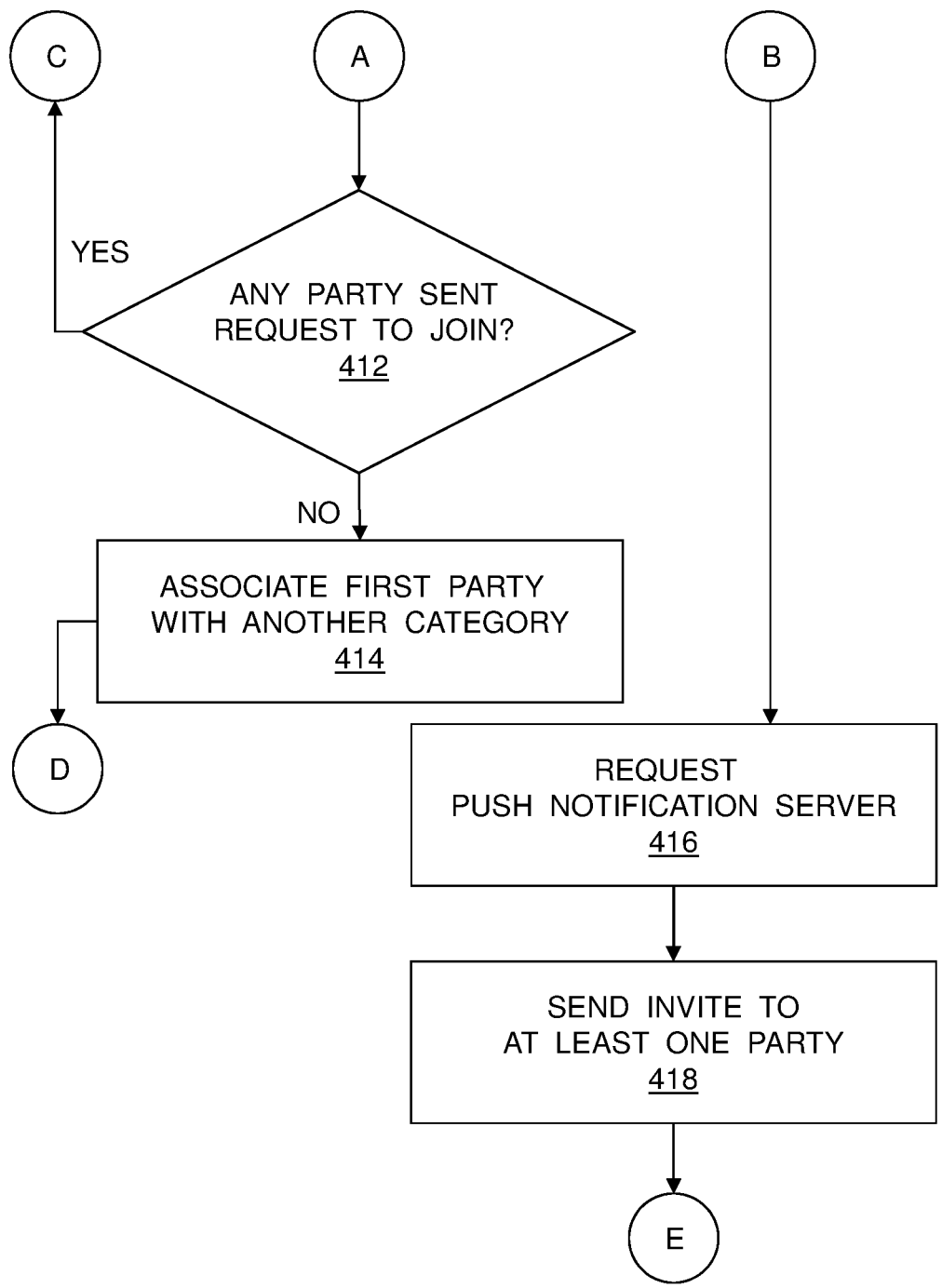
Figure 4C:
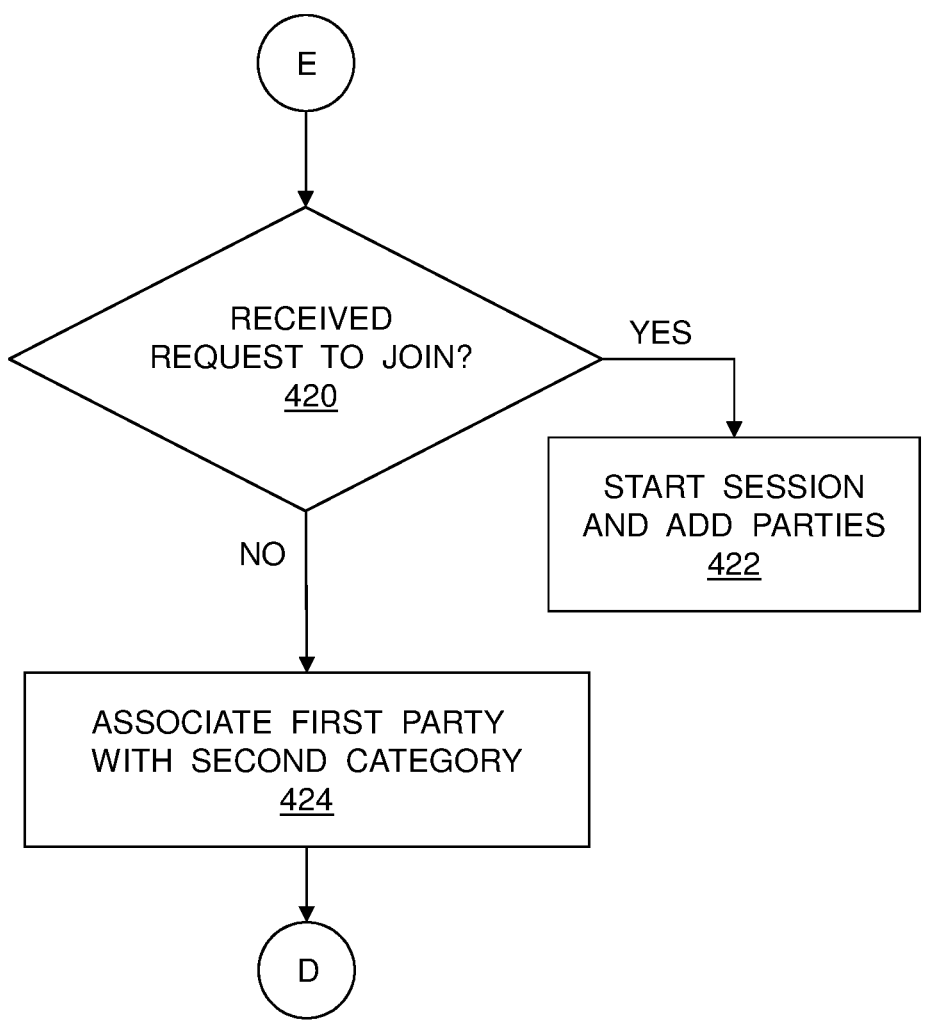

FIGS. 4A, 4B and 4C collectively are an illustration of steps of a method for managing a game session of a multiplayer game, in accordance with an embodiment of the present disclosure. The method is depicted as a collection of steps in a logical flow diagram, which represents a sequence of steps that can be implemented in hardware, software, or a combination thereof.

At a step 402, a game server receives a request to start a game session of the multiplayer game from a first party.

At a step 404, the game server associates the first party with a first category of players of the multiplayer game.

At a step 406, the game server searches for other online parties associated with the first category. If at least one online party is found in the search, a step 408 is performed. At the step 408, the game server starts a new game session of the multiplayer game, and adds the first party and the at least one online party to the new game session.

If, at the step 406, no online party is found, a step 410 is performed.

At the step 410, the game server determines whether or not the number of players within the first category is less than a threshold number. If it is determined that the number of players within the first category is more than or equal to the threshold number, a step 412 is performed.

At the step 412, the game server waits for a first predetermined period of time. If any party indicates willingness to join, the step 408 is performed. If none of the players within the first category indicates willingness to play the multiplayer game within the first predetermined period of time, a step 414 is performed.

At the step 414, the game server associates the first party with another category of players, and repeats the step 406 for this category of players.

If, at the step 410, it is determined that the number of players within the first category is less than the threshold number, a step 416 is performed. At the step 416, the game server sends, to a push notification server, a request to send an invite to at least a second party within the first category.

At a step 418, the push notification server sends the invite to the at least a second party associated with the first category.

At a step 420, the game server checks whether a request to join a game session of the multiplayer game has been received from the at least a second party within a second predetermined period of time. If the game server receives a request to join, a step 422 is performed. At a step 422, the game server starts a new game session and adds the first party and the at least a second party to the game session.

If the request to join from the at least a second party is not received within the second predetermined period of time, a step 424 is performed. At the step 424, the game server associates the first party with a second category of players, and repeats the step 406 for the second category of players.

The steps 402 to 424 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus, comprising:
a first gaming device; and
a server configured to detect a request from the first gaming device to start a new game session of a multiplayer game, wherein upon receipt of the request the server is further configured to cause the apparatus to:
identify a ranking of the first party associated with the first gaming device;
identify a first category of players of the multiplayer game with a ranking position that is within a predetermined range of the identified ranking of the first party;
search the first category of players for at least one online party; and
when an online party is detected, send a game play invite to the online party with a request to start the new game session between the gaming device of the first party and a gaming device of the detected online party, wherein the game play invite is configured to cause a gaming application corresponding to the multiplayer game to open on the gaming device of the detected online party; or,
when at at least one online party is not detected, send the game play invite to gaming devices of at least one player in the first category, the game play invite configured to enable a gaming device of at least one player in the first category to start the game application associated with the multiplayer game when the game application is not active on the gaming device of the at least one player and when at least one player on the first category responds to the game play invite, synchronize the game application active on the first gaming device with the game application active on a gaming device of the responding at least one player and start the new game session between the first gaming device and the gaming device of the responding at least one player.

2. The system according to claim 1, wherein the server is further configured to, when no reply to the game play invite is received within a predetermined time period, associate the first party with at least one further category of players, the at least one further category of players being associated with a game playing characteristic of the first party and search the at least one further category of players for at least one online player, and when at least one online player in the at least one further category is detected, synchronize the game application active on the gaming device of the first party with a corresponding game application active on a gaming device of the detected at least one online player and start the new game session between the gaming device of the first party and the gaming device of the detected at least one online player.

3. The system according to claim 2, wherein the server is further configured to, when at least one online player in at least further category is not detected, send a game play invite to gaming devices of players in the at least one further category and start the new game session between the gaming device of the first party and a gaming device of at least one player responding to the game play invite after synchronizing the game application on the gaming device of the first party with a corresponding game application on the gaming device of the at least one player responding to the game play invite.

4. The system according to claim 1, wherein the at least one further category is a category in which the first player and players in the at least one further category have substantially similar skill levels related to the multiplayer game and the skill levels are derived from a leader board of the multiplayer game.

5. The system according to claim 4, wherein the server is further configured to automatically and repeatedly continue to send game play invites to connected gaming devices of players in the at least one further category until a response is received or game play invites have been sent to all connected gaming devices in the at least one further category, wherein, when a response to a game play invite is received, the server is configured to connect the gaming device of the first part and a gaming device of a player in the at least one further category associated with the response, in a gaming session and synchronize the game application on the gaming device of the first party with a corresponding game application on the gaming device of the player in the at least one further category associated with the response.

6. The system according to claim 5, wherein the server is further configured to determine when a request to join a game session is received from at least one player in the at least one further category, connect the gaming device of the first party and a gaming device of the at least one player and synchronize the game application on the gaming device of the first party with a corresponding game application on the gaming device of the at least one player in the game session.

7. A method in a gaming apparatus including a processor configured to execute non-transitory machine readable instructions, the method comprising executing the non-transitory machine readable instructions by the processor to cause the gaming apparatus to:
send an invite to a gaming device of a first player over an electronic communication connection of a gaming network to start a new gaming session of a multiplayer game with another gaming device of another player, the invite configured to open a game application on the gaming device of the first player corresponding to the multiplayer game;
identify a ranking of the first player;
identify a first category of players of the multiplayer game with a ranking position that is within a predetermined range of the identified ranking of the first player;
search the first category of players for at least one online player; and
when an online player is detected, synchronize the game application on the gaming device of the first player with a game application on a gaming device of the detected at least one online player and start the new game session between the gaming device of the first player and the gaming device of the detected at least one online player; or,
when at least one online player is not detected, send the invite to gaming devices of players in the first category, the invite configured to start a game application on the gaming devices of players in the first category when the game application is not active, and when at least one player in the first category responds to the invite, synchronize the game application active on the gaming device of the first player with a corresponding game application active on a gaming device of the responding at least one player and start the new game session between the gaming device of the first player and the gaming device of the at least player responding to the invite.

8. The method according to claim 7, the method further comprising, when no reply to the invite is received within a predetermined time period, associate the first player with at least one further category of players, the at least one further category of players being associated with game playing characteristic of the first player and search the at least one further category of players for at least one online player, and when at least one online player in the at least one further category is detected, synchronize the game application on the gaming device of the first player with a corresponding game application on a gaming device of the at least one online player in the at least one further category, and start the new game session between the gaming device of the first player and the gaming device of the detected at least one online player.

9. The method according to claim 8, further comprising, when at least one online player in at least further category is not detected, sending the invite to gaming devices of players in the at least one further category and starting the new game session between the gaming device of the first player and a gaming device of at least one player responding to the game play invite after synchronizing the game application of the gaming device of the first player and the gaming device of the at least one player responding to the game play invite.

10. The method according to claim 9, wherein the at least one further category is a category in which the first player and players in the at least one further category have substantially similar skill levels related to the multiplayer game and the skill levels are derived from a leader board of the multiplayer game.

11. The method according to claim 10, wherein the method further comprises automatically and repeatedly continue to send invites to connected gaming devices of players in the at least one further category until a response is received or invites have been sent to all connected gaming devices in the at least one further category, wherein, when a response to an invite is received, the server is configured to connect the gaming device of the first player and a gaming device of a player in the at least one further category associated with the response, in a gaming session after synchronizing the game application on the gaming device of the first player with a game application of the gaming device of the player in the at least one further category associated with the response.

12. The method according to claim 11, wherein the method further comprises determining when a request to join a game session is received from at least one player in the at least one further category, synchronizing the game application of the gaming device of the first player and a gaming device of the at least one player in the at least one further category and connecting the gaming device of the first party and the gaming device of the at least one player in the at least one further category in the game session.

* * * * *